(12) United States Patent
Shuai et al.

(10) Patent No.: US 12,356,471 B2
(45) Date of Patent: Jul. 8, 2025

(54) COMMUNICATION METHOD, APPARATUS, AND SYSTEM

(71) Applicant: HUAWEI TECHNOLOGIES CO., LTD., Guangdong (CN)

(72) Inventors: Yanglai Shuai, Shanghai (CN); Yu Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/505,641

(22) Filed: Nov. 9, 2023

(65) Prior Publication Data

US 2024/0147552 A1 May 2, 2024

Related U.S. Application Data

(63) Continuation of application No. 17/383,754, filed on Jul. 23, 2021, now Pat. No. 11,849,491, which is a
(Continued)

(30) Foreign Application Priority Data

Jan. 25, 2019 (CN) .......................... 201910075653.9

(51) Int. Cl.
*H04W 76/10* (2018.01)
*H04W 28/02* (2009.01)
*H04W 28/08* (2023.01)

(52) U.S. Cl.
CPC ....... *H04W 76/10* (2018.02); *H04W 28/0289* (2013.01); *H04W 28/08* (2013.01)

(58) Field of Classification Search
CPC . H04W 76/10; H04W 28/0289; H04W 28/08; H04W 28/0252; H04W 28/0284;
(Continued)

(56) References Cited

U.S. PATENT DOCUMENTS

2007/0207806 A1* 9/2007 Shaheen ............... H04W 68/00
455/436
2009/0059856 A1* 3/2009 Kermoal ............... H04W 16/14
370/329
(Continued)

FOREIGN PATENT DOCUMENTS

CN 101080096 A 11/2007
CN 106162730 A 11/2016
(Continued)

OTHER PUBLICATIONS

Tien, "User Equipment Migration Method, Centralized Unit, Distribution Unit and System", May 22, 2020, WO, WO 2020098730. (Year : 2020).*
(Continued)

*Primary Examiner* — Michael K Phillips
(74) *Attorney, Agent, or Firm* — Fish & Richardson P.C.

(57) ABSTRACT

Example communication methods and apparatus are described. In one example method, a first entity sends an access request of a terminal to a second entity. The second entity determines whether to allow access of the terminal, and sends an access response to the first entity. In response to the access response indicating that access of the terminal is allowed, the first entity sends a radio bearer (RB) setup request to the second entity. The second entity determines whether to allow setup of an RB to the terminal, and sends an RB setup response to the first entity. In response to the RB setup response indicating that setup of the RB to the terminal is allowed, the first entity triggers setup of the RB to the terminal.

20 Claims, 12 Drawing Sheets

Related U.S. Application Data continuation of application No. PCT/CN2019/122193, filed on Nov. 29, 2019.

(58) Field of Classification Search
CPC .......... H04W 28/082; H04W 28/0942; H04W 40/24; H04W 76/12; H04W 36/22; H04W 40/36; H04W 76/30; H04W 88/085
See application file for complete search history.

(56) References Cited

U.S. PATENT DOCUMENTS

| | | | |
|---|---|---|---|
| 2011/0194535 A1* | 8/2011 | Johansson | H04W 28/24 370/329 |
| 2016/0112896 A1* | 4/2016 | Karampatsis | H04L 47/22 370/230.1 |
| 2017/0127362 A1 | 5/2017 | Tavildar et al. | |
| 2017/0325214 A1* | 11/2017 | Lu | H04W 4/70 |
| 2017/0367004 A1* | 12/2017 | Yoon | H04W 28/0231 |
| 2018/0206178 A1* | 7/2018 | Tenny | H04W 72/29 |
| 2018/0227419 A1* | 8/2018 | Stojanovski | H04L 65/1045 |
| 2019/0059027 A1* | 2/2019 | Yang | H04W 36/0064 |
| 2019/0150220 A1 | 5/2019 | Byun et al. | |
| 2019/0166526 A1* | 5/2019 | Xu | H04W 92/20 |
| 2019/0380158 A1* | 12/2019 | Gao | H04W 8/22 |
| 2020/0154498 A1 | 5/2020 | Wang et al. | |
| 2020/0229258 A1 | 7/2020 | Wang et al. | |
| 2020/0383164 A1 | 12/2020 | Kim et al. | |
| 2021/0400567 A1* | 12/2021 | Sha | H04W 72/21 |
| 2023/0189376 A1 | 6/2023 | Fiorani et al. | |

FOREIGN PATENT DOCUMENTS

| | | |
|---|---|---|
| CN | 108696947 A | 10/2018 |
| CN | 109151871 A | 1/2019 |
| WO | 2018009340 A1 | 1/2018 |
| WO | WO-2020098730 A1 * | 5/2020 ............ H04W 28/08 |

OTHER PUBLICATIONS

Anonymous, "xRAN FORUM Fronthaul Working Group White Paper," Oct. 2017, 7 pages.
Extended European Search Report issued in European Application No. 19912043.7 on Feb. 7, 2022, 7 pages.
NGMN Alliance, "NGMN Overview on 5G Ran Functional Decomposition," Feb. 26, 2018, 47 pages.
Office Action issued in Chinese Application No. 201910075653.9 on Apr. 1, 2021, 10 pages (with English translation).
PCT International Search Report and Written Opinion issued in International Application No. PCT/CN2019/122193 on Mar. 3, 2020, 19 pages (with English translation).
Vodafone, "Common Radio Resource Management Functional Split for Different Deployment Scenarios," 3GPP TSG-RAN WG3 NR#2, R3-172484, Qingdao, China, May 27-29, 2017, 13 pages.

* cited by examiner

COMMUNICATION METHOD, APPARATUS, AND SYSTEM

CROSS-REFERENCE TO RELATED APPLICATIONS

This application is a continuation of U.S. patent application Ser. No. 17/383,754, filed on Jul. 23, 2021, which is a continuation of International Application No. PCT/CN2019/122193, filed on Nov. 29, 2019. The International Application claims priority to Chinese Patent Application No. 201910075653.9, filed on Jan. 25, 2019. All of the aforementioned patent applications are hereby incorporated by reference in their entireties.

TECHNICAL FIELD

This application relates to the field of communication technologies, and in particular, to a communication method, apparatus, and system.

BACKGROUND

FIG. 1 provides an example of a typical network architecture. As shown in the figure, a terminal accesses a network by using an access network, and under the control of a mobility management entity, establishes a tunnel between the access network and a local serving gateway, and establishes a tunnel between the local serving gateway and a data gateway, or directly establishes a tunnel between the terminal and a data gateway, thereby establishing connectivity between UE and a packet data network. The mobility management entity is responsible for managing terminal location information, access authentication, non-access stratum signaling, signaling security, and the like. The local serving gateway is a data anchor that is of the terminal and that moves within a small range, is an interface entity in a core network and the access network, and is responsible for routing and forwarding of user data. A core control entity is configured to record and manage the terminal location information and authentication and authorization information. When the terminal exits a network, a resource allocated to the terminal needs to be released in time, and the resource includes a radio channel, a bearer, various tunnels, stored information, and the like.

In discussion of a next-generation radio access network architecture, it is proposed to evolve a radio access network (RAN) into a centralized unit (CU) and a distributed unit (DU) to support flexible deployment. A CU user plane (CU-UP) and a CU control plane (CU-CP) are decoupled to support distributed deployment, as shown in FIG. 2. Certainly, centralized deployment is also available.

SUMMARY

This application provides a communication method, apparatus, and system, to support a more flexible CU-CP deployment manner.

According to a first aspect, this application provides a communication method, including:

A first entity in a CU-CP sends an access request of a terminal to a second entity in the CU-CP; the second entity determines, based on the access request, whether to allow access of the terminal, and sends an access response to the first entity; if the access response indicates that access of the terminal is allowed, the first entity sends a radio bearer setup request to the second entity; the second entity determines whether to allow setup of an RB to the terminal, and sends a radio bearer setup response to the first entity; and if the setup response indicates that setup of the RB to the terminal is allowed, the first entity triggers setup of the RB to the terminal.

In a possible implementation, the access request further includes one or more of the following information: a quantity of terminals that access a base station to which the first entity belongs, identifiers of one or more cells covered by the base station, and a quantity of terminals that access the one or more cells.

In a possible implementation, after the first entity sends the access request of the terminal to the second entity, the method further includes: The first entity receives a release request sent by the second entity, where the release request includes an identifier of another terminal and a serving cell identifier of the another terminal; and the first entity releases a resource of the another terminal based on the release request.

In a possible implementation, the radio bearer access request includes RB information that is obtained from a distributed unit DU and managed by the DU.

In a possible implementation, after the first entity sends the radio bearer setup request to the second entity, the method further includes: The second entity sends an RB release request to the first entity, where the RB release request includes one or more of the following information: an identifier of a to-be-released terminal, a serving cell identifier of the to-be-released terminal, and information about a to-be-released RB; and the first entity releases an RB of the to-be-released terminal based on the release request.

In a possible implementation, the method further includes: The second entity sends a handover indication to the first entity, where the handover indication is used to request to hand over a terminal that accesses the second entity to a second entity in a neighboring CU-CP; and the first entity hands over, according to the handover indication, the terminal that accesses the second entity to the second entity in the neighboring CU-CP.

In a possible implementation, before the second entity sends the handover indication to the first entity, the method further includes: The first entity receives a measurement report sent by the terminal; and the first entity sends the measurement report to the second entity.

In a possible implementation, the handover request includes one or more of the following information: an identifier of a to-be-handed-over terminal, an identifier of a target cell, and target frequency information.

In a possible implementation, the method further includes: The first entity sends a cell congestion status report to the second entity; the second entity sends a cell congestion relieve request to the first entity, where the request includes a relieving policy; and the first entity performs congestion relieving processing based on the relieving policy.

In a possible implementation, before the first entity sends the cell congestion status report to the second entity, the method further includes: The first entity receives configuration update information sent by the DU; and the first entity determines, based on the configuration update information, cell congestion managed by the first entity.

In a possible implementation, the cell congestion status report includes one or more of the following information: an identifier of a cell, a bearer type, an ARP, a congestion type, and a congestion level.

In a possible implementation, the method further includes: The first entity sends a cell status report to the second entity; and the second entity determines, based on the cell status report, whether to perform load balancing.

In a possible implementation, the cell status report includes one or more of the following information: an identifier of a cell, a quantity of terminals in the cell, a downlink capacity of the cell, uplink and downlink physical resource block usage of the cell, uplink and downlink physical resource block usage of a guaranteed bit rate of the cell, uplink and downlink physical resource block usage of a non-guaranteed bit rate of the cell, a hardware load level, and a transmission load level.

In a possible implementation, if the second entity determines to perform load balancing, the method further includes: The second entity sends a request of obtaining information about a neighboring cell to the first entity; the first entity sends the information about the neighboring cell to the second entity; the second entity sends a terminal release control message to the first entity; and the first entity performs reselection priority control based on the terminal release control message.

In a possible implementation, the information about the neighboring cell includes one or more of the following information: a serving cell identifier, an identifier of the neighboring cell, a quantity of terminals in the neighboring cell, uplink and downlink physical resource block usage of the neighboring cell, uplink and downlink physical resource block usage of a guaranteed bit rate of the neighboring cell, uplink and downlink physical resource block usage of a non-guaranteed bit rate of the neighboring cell, a hardware load level of the neighboring cell, and a transmission load level of the neighboring cell.

In a possible implementation, the terminal release control message includes one or more of the following information: an identifier of a cell, a quantity of to-be-released terminals, and a frequency on which camping is preferentially performed.

In a possible implementation, after the first entity sends the information about the neighboring cell to the second entity, the method further includes: The second entity sends a terminal selection policy control message to the first entity, where the terminal selection policy control message includes one or more of the following information: an identifier of a cell, a quantity of connected-mode terminals to be triggered to perform measurement, and frequency information whose measurement is to be triggered; the first entity triggers, based on the terminal selection policy control message, the terminal to perform measurement; the first entity sends a terminal selection result report to the second entity after receiving a measurement report from the terminal, where the terminal selection result report includes one or more of the following information: an identifier of a cell, a terminal list, and the measurement report of the terminal; the second entity determines a to-be-handed-over terminal based on the terminal selection result report; the second entity sends a handover control message to the first entity; and the first entity hands over the terminal based on the handover control message.

In a possible implementation, the handover control message includes one or more of the following information: a serving cell identifier, an identifier of the terminal, and a list of target neighboring cells.

According to a second aspect, an embodiment of this application provides a communication system, including a CU-CP and at least one DU, where the CU-CP includes at least one first entity and a second entity, the second entity is configured to perform a function of a radio resource management RRM algorithm in the base station, and the at least one first entity is configured to perform functions of a packet data convergence protocol PDCP layer and a radio resource control RRC layer in the base station.

In a possible implementation, the RRM algorithm includes one or more of the following: a primary component carrier PCC anchor selection algorithm of carrier aggregation CA, a secondary component carrier SCC selection algorithm of the CA, an aggregation type determining algorithm, a user admission and preemption control algorithm, a measurement control algorithm, a handover decision algorithm, a single radio voice call continuity SRVCC decision algorithm, a cell congestion control algorithm, a centralized unit control plane CU automatic congestion control algorithm, an access category control algorithm, a load balancing control algorithm, an optimal carrier selection control algorithm, a distributed self-organizing network DSON control algorithm, a cell failure monitoring algorithm, and a compensation algorithm.

In a possible implementation, the first entity is specifically configured to perform one or more of the following procedures: a measurement configuration delivery procedure, a measurement report reporting procedure, a terminal access procedure, a terminal release procedure, a system broadcast procedure, a circuit switched fallback procedure, an SRVCC decision procedure, and a radio access network information management RIM procedure.

According to a third aspect, an embodiment of this application provides a communication system, including a centralized unit control plane CU-CP and at least one distributed unit DU, where the CU-CP includes at least one first entity and a second entity, the first entity is configured to perform functions performed by the first entity in the method according to any item of the first aspect, and/or the second entity is configured to perform functions performed by the second entity in the method according to any item of the first aspect.

According to a fourth aspect, an embodiment of this application provides a communication apparatus, and the communication apparatus has a function of implementing the entity in the foregoing embodiments. The function may be implemented by hardware, or may be implemented by hardware by executing corresponding software. The hardware or software includes one or more units or modules corresponding to the foregoing function.

In a possible implementation, the communication apparatus may be a first entity in a CU-CP, or may be a component that may be used in the first entity, for example, a chip, a chip system, or a circuit, and the communication apparatus may include a transceiver and a processor. The processor may be configured to support the communication apparatus in performing a corresponding function of the foregoing first entity, and the transceiver is configured to support the communication apparatus in communicating with another entity (for example, the second entity) and the like. Optionally, the communication apparatus may further include a memory, and the memory may be coupled to the processor, and stores program instructions and data that are necessary to the communication apparatus. The transceiver may be an independent receiver, an independent transmitter, a transceiver integrated with a receiving/transmission function, or an interface circuit.

In another possible implementation, the communication apparatus may be a second entity in a CU-CP, or may be a component that may be used in the second entity, for example, a chip, a chip system, or a circuit, and the communication apparatus may include a transceiver and a processor. The processor may be configured to support the communication apparatus in performing a corresponding function of the foregoing second entity, and the transceiver is configured to support the communication apparatus in communicating with another entity (for example, the first entity) and the like. Optionally, the communication apparatus may further include a memory, and the memory may be coupled to the processor, and stores program instructions and data that are necessary to the communication apparatus. The transceiver may be an independent receiver, an independent transmitter, a transceiver integrated with a receiving/transmission function, or an interface circuit.

According to a fifth aspect, an embodiment of this application provides a communication apparatus, and the communication apparatus may be a first entity in a CU-CP, and may include a receiving unit, a sending unit, and a processing unit. The receiving unit is configured to perform a receiving function of the first entity in the first aspect, the sending unit is configured to perform a sending function of the first entity in the first aspect, and another function of the first entity is performed by the processing unit.

According to a sixth aspect, an embodiment of this application provides a communication apparatus, and the communication apparatus may be a second entity in a CU-CP, and may include a receiving unit, a sending unit, and a processing unit. The receiving unit is configured to perform a receiving function of the second entity in the first aspect, the sending unit is configured to perform a sending function of the second entity in the first aspect, and another function of the second entity is performed by the processing unit.

According to a seventh aspect, an embodiment of this application provides a computer-readable storage medium, where the computer-readable storage medium stores computer instructions, and when the instructions are run on a computer, the computer is enabled to perform functions performed by the first entity in the method according to any item of the first aspect, or the computer is enabled to perform functions performed by the second entity in the method according to any item of the first aspect.

According to an eighth aspect, an embodiment of this application provides a computer program product including instructions, and when the computer program product runs on a computer, the computer is enabled to perform functions performed by the first entity in the method according to any item of the first aspect, or the computer is enabled to perform functions performed by the second entity in the method according to any item of the first aspect.

According to a ninth aspect, this application provides a chip, where the chip is connected to a memory, and is configured to read and execute a software program stored in the memory, to implement functions performed by the first entity in the method according to any item of the first aspect, or to implement functions performed by the second entity in the method according to any item of the first aspect.

DESCRIPTION OF EMBODIMENTS

To make the objectives, technical solutions, and advantages of this application clearer, the following further describes this application in detail with reference to the accompanying drawings.

To save hardware costs and implement flexible deployment, coordination, and management of stations, a manner in which a CU and a DU are separated is used for an architecture of a base station (gNB) in 5G, in other words, a protocol stack of the base station is divided, and the CU and the DU separately have protocol stacks of different parts of the base station. Generally, a service data adaptation protocol (SDAP) layer, a radio resource control (RRC) layer, and a packet data convergence protocol (PDCP) layer (the PDCP layer includes a control plane PDCP-C layer and a user plane PDCP-U layer) are configured in the CU, and a radio link control (RLC) layer (the RLC layer includes a control plane RLC-C layer and a user plane RLC-U layer), a medium access control (MAC) layer, and a physical layer (PHY) are configured in the DU.

Figure 1:
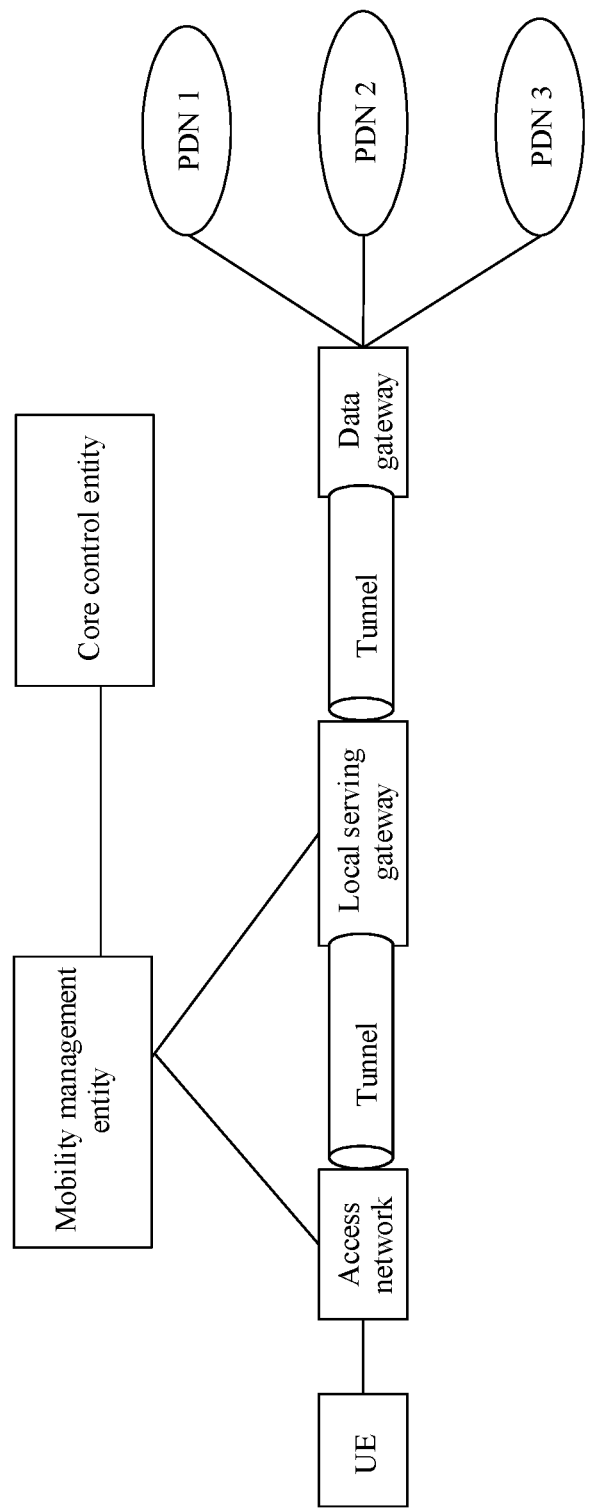
FIG. 1 shows a network architecture.
Figure 2:
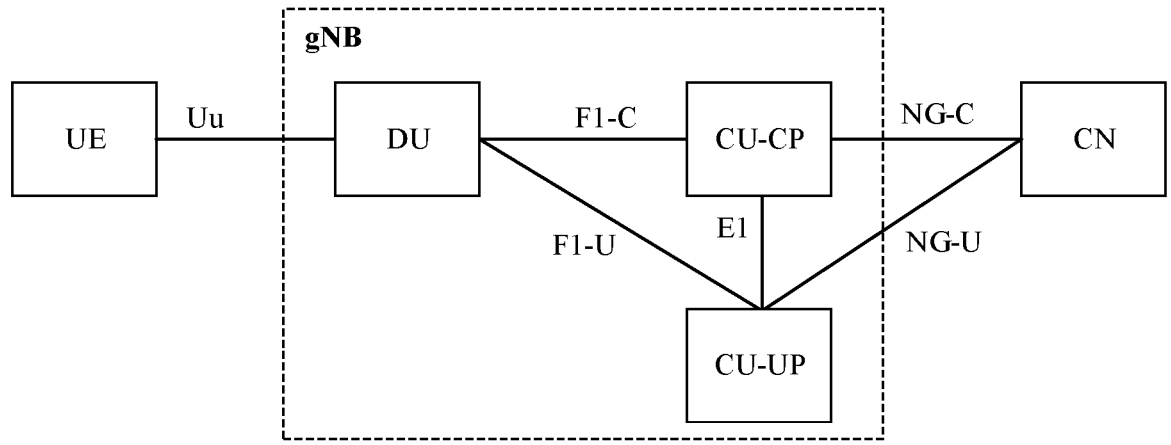
FIG. 2 shows a CU-DU architecture.

To support a more flexible deployment manner, a user plane (CU-UP) in the CU and a control plane (CU-CP) in the CU may be further decoupled, as shown in FIG. 2. Functions of the CU-CP mainly include: managing a radio resource based on a radio resource management (RRM) algorithm, performing a signaling procedure, and the like.

Figure 3A:
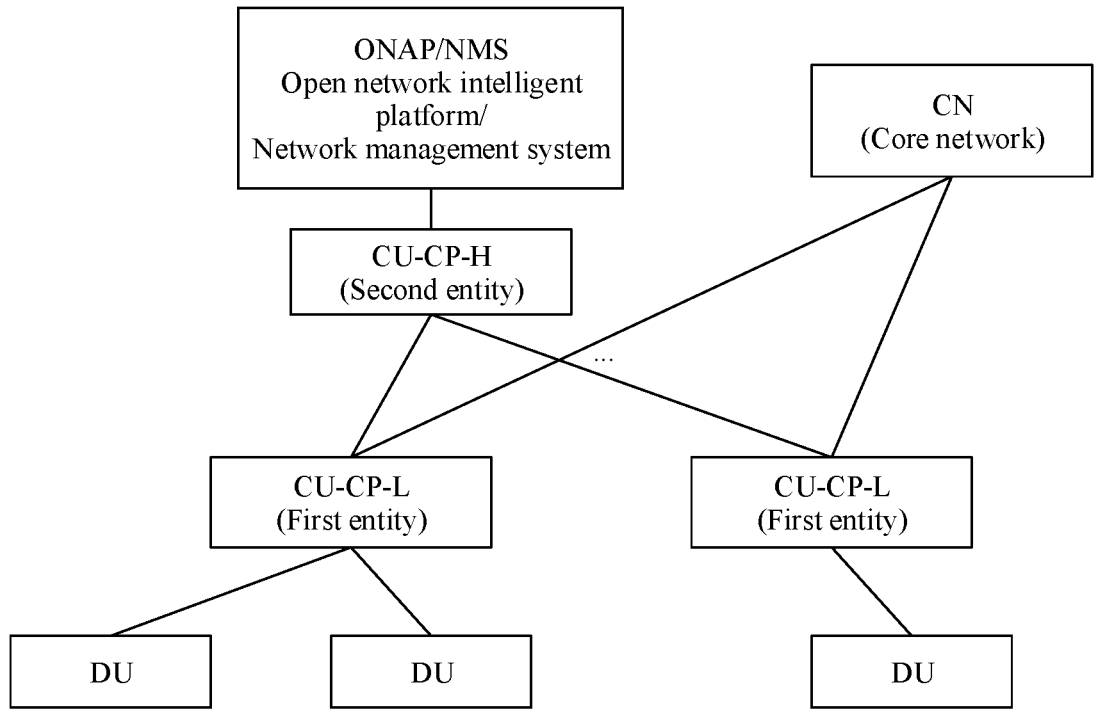
FIG. 3a and FIG. 3b show a CU-CP architecture according to an embodiment of this application.
Figure 3B:
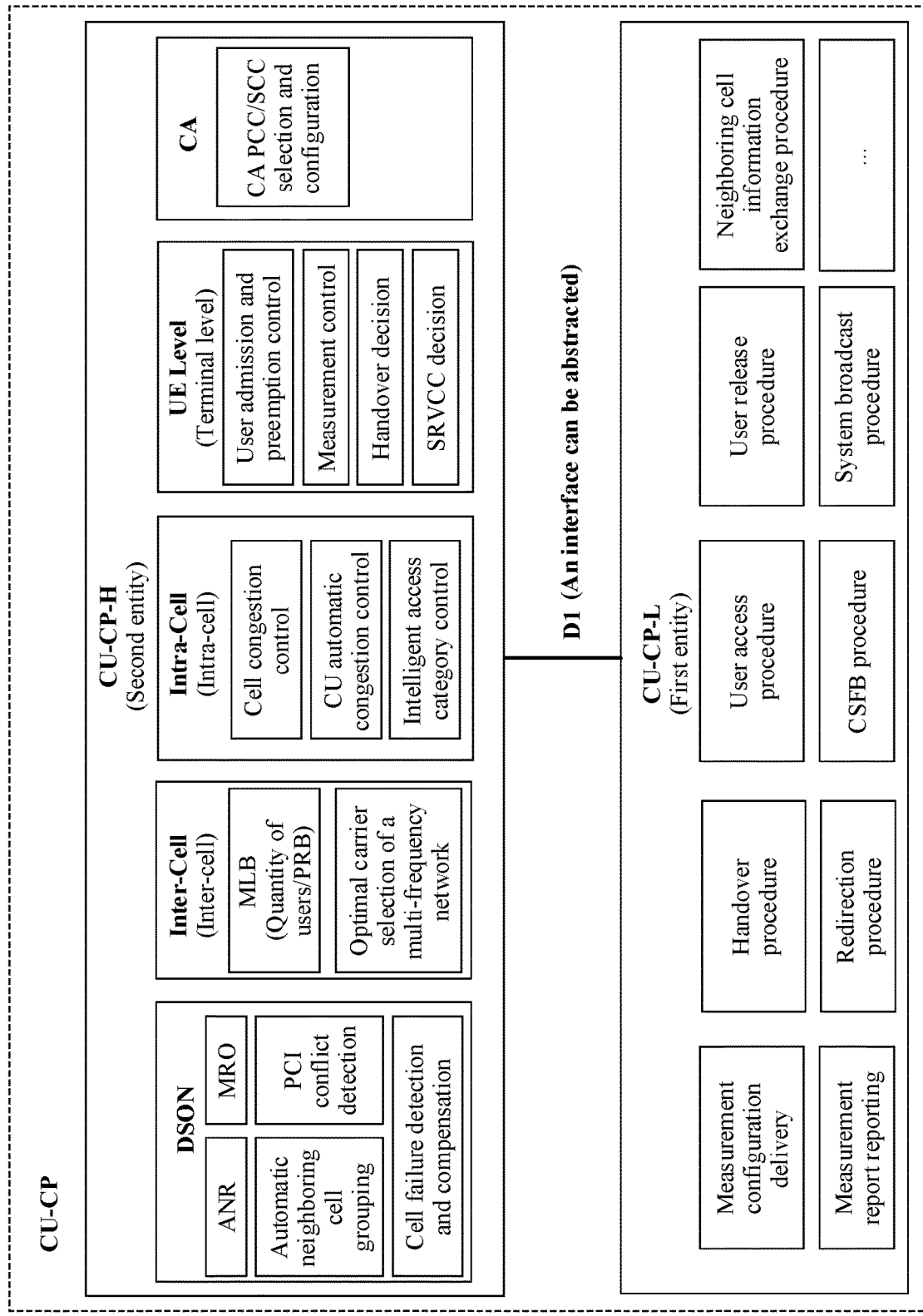

However, the foregoing deployment manner still has some limitations. Therefore, an embodiment of this application provides a more flexible deployment manner. As shown in FIG. 3a, in this embodiment of this application, a CU-CP may further include a first entity (CU-CP-L) and a second entity (CU-CP-H), to separate an RRM algorithm function and a signaling execution part of the CU-CP, as shown in FIG. 3b.

The first entity may be configured to perform functions of a PDCP layer and an RRC layer in the CU-CP. Specifically, the first entity may be configured to perform one or more of the following procedures: a measurement configuration delivery procedure, a measurement report reporting procedure, a terminal access procedure, a terminal release procedure, a system broadcast procedure, a circuit switched fallback procedure, and a single radio voice call continuity SRVCC decision procedure.

The second entity may be configured to implement a function of an RRM algorithm. Specifically, the RRM algorithm may include one or more of the following: a primary component carrier (primary component carrier, PCC) anchor selection algorithm of carrier aggregation (CA), a secondary component carrier (SCC) selection algorithm of the CA, an aggregation type determining algorithm, a user admission and preemption control algorithm, a measurement control algorithm, a handover decision algorithm, an SRVCC decision algorithm, a cell congestion control algorithm, a CU automatic congestion control algorithm, an access category control algorithm, a load balancing control algorithm, an optimal carrier selection control algorithm, a distributed self-organizing network (DSON) control algorithm, a cell failure monitoring algorithm, a compensation algorithm, and the like.

In brief, the second entity may be configured to perform decisive determining, and the first entity may be configured to perform a corresponding procedure operation.

In the foregoing architecture provided in this embodiment of this application, the CU-CP is further decoupled, so that network deployment is more flexible. For example, in an existing architecture, when algorithm upgrading is performed for the CU-CP, an algorithm, process execution, and the like in the CU-CP all need to be updated. However, after the foregoing architecture provided in this embodiment of this application is applied, when only the RRM algorithm needs to be upgraded, only the second entity needs to be upgraded, and no unnecessary upgrade is required for the first entity. Therefore, upgrade efficiency can be improved, and a resource waste caused by upgrading can be avoided.

Figure 4:
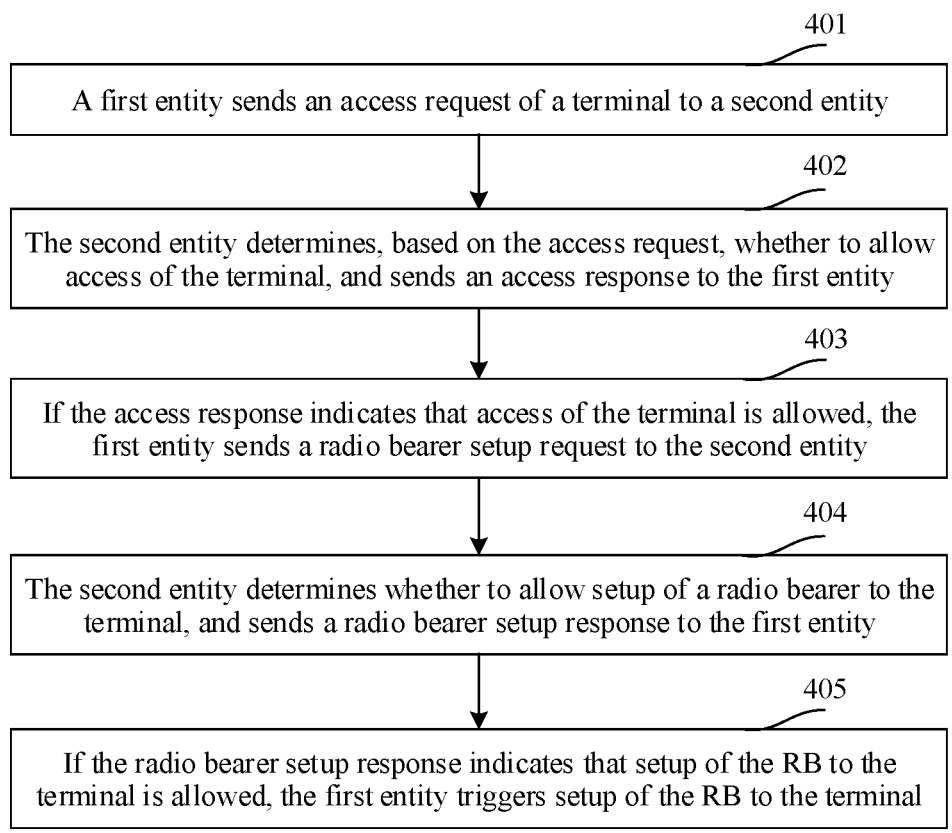
FIG. 4 is a schematic flowchart of a communication method according to an embodiment of this application.

Based on the foregoing architecture, an embodiment of this application further provides a communication method, and the communication method is used to implement an access procedure of a terminal after the foregoing architecture provided in the embodiment of this application is applied. As shown in FIG. 4, the method may include the following steps.

Step 401: A first entity in a CU-CP sends an access request of a terminal to a second entity in the CU-CP.

For example, in an initial access procedure of the terminal, a core network sends an initial context setup request to the CU-CP, and the request includes context and the like of the terminal. Specifically, the core network may send the initial context setup request to the first entity in the CU-CP. After receiving the request, the first entity sends the access request of the terminal to the second entity, so that the second entity determines whether to allow access of the terminal.

Optionally, the access request may include one or more of the following information: a bearer type of the terminal, an allocation retention priority (ARP) of the terminal, a synchronization status of the terminal, and the like. The second entity may determine, based on the foregoing information, whether to allow access of the terminal, a resource allocated to the terminal, and the like.

Further, the access request may further include one or more of the following information: a quantity of terminals that access a base station to which the first entity belongs, an identifier of a cell in the base station, and a quantity of terminals that access the cell. The second entity may further determine, based on a load status of a base station to which the CU-CP belongs, whether there are enough resources to be allocated to the terminal.

Step 402: The second entity determines, based on the access request, whether to allow access of the terminal, and sends an access response to the first entity.

For example, the second entity may first determine validity of the terminal based on the information included in the access request, and determine whether there are currently enough resources that can be allocated to the terminal. If it is determined that the terminal is valid and there are enough allocable resources, the second entity allows access of the terminal, and sends the access response to the first entity, to indicate that access of the terminal is allowed. If the second entity determines, based on the information included in the access request, that the terminal is invalid, and/or determines that currently there are not enough resources that can be allocated to the terminal, the access response sent by the second entity to the first entity may indicate that access of the terminal is not allowed.

Step 403: If the access response indicates that access of the terminal is allowed, the first entity sends a radio bearer (RB) setup request to the second entity. The radio bearer setup request may include one or more of the following information: an identifier of the terminal, a serving cell identifier of the terminal, a type of the terminal, an air interface resource application result of the terminal, an ARP of the terminal, radio bearer information, and the like. The second entity may allocate a corresponding radio bearer or the like to the terminal based on the information.

In addition, if the access response indicates that access of the terminal is allowed, the first entity may further send a terminal context setup request (UE context setup request) to a DU, to indicate the DU to configure a resource or the like for the terminal.

Step 404: The second entity determines whether to allow setup of a radio bearer to the terminal, and sends a radio bearer setup response to the first entity.

Specifically, the second entity may configure the radio bearer for the terminal based on the information in the radio bearer setup request, so that the configured radio bearer can meet a requirement of the terminal for quality of service (QoS).

Step 405: If the radio bearer setup response indicates that setup of the RB to the terminal is allowed, the first entity triggers setup of the RB to the terminal.

For example, after receiving a response indicating that setup of the radio bearer is allowed, the first entity may send a terminal context setup request (UE context setup request) to the DU, to indicate the DU to configure the radio bearer for the terminal.

In the foregoing method embodiment, a function of the CU-CP is further decoupled, so that a deployment manner of a network device is more flexible. Because a radio resource management function and a signaling execution function in the CU-CP are separated, during upgrading of an RRM algorithm stored in the CU-CP, only the second entity in the CU-CP may be upgraded, and a program or an algorithm for signaling execution does not need to be updated together; or only a program or an algorithm that is in the first entity and that is used to implement signaling execution may be upgraded, and the RRM algorithm does not need to be updated together. Therefore, an upgrading manner is more flexible.

Optionally, after the second entity receives, in step 402, the access request of the terminal that is sent by the first entity, the second entity may further determine, based on a quantity of terminals that currently access the second entity, a resource use status, and the like, whether there are enough resources that can be allocated to the terminal. If the second entity determines, based on information about the terminal, that the terminal is a registered terminal and that an identity of the terminal is valid, but resources that can be currently allocated to the terminal are insufficient, the second entity may further determine whether there is another terminal whose resource can be released. For example, if the second entity finds that a terminal 1 has been accessed previously, but is currently in a non-connected mode, the second entity may release a resource of the terminal 1.

Specifically, the second entity may send a release request to the first entity, and the release request includes an identifier of a to-be-released terminal and a serving cell identifier of the to-be-released terminal. The first entity releases, based on the received release request, a resource that is of the terminal and that corresponds to the identifier of the terminal in a cell corresponding to the serving cell identifier. After the resource is successfully released, the first entity may send a release response to the second entity to indicate that the resource is successfully released. The second entity determines again whether there are enough resources that can be allocated to the terminal that requests to access. If a determining result is that there are enough resources that can be allocated to the terminal that requests to access, the second entity allocates an access resource to the terminal that requests to access.

In a possible implementation, the radio bearer access request may further include RB information that is obtained from the DU and managed by the DU, so that the second entity determines, based on the RB information currently managed by the DU, whether an RB can be set up to the terminal. If the second entity determines, based on the RB information currently managed by the DU, that an RB currently managed by the DU has relatively heavy load, it is determined that the RB cannot be set up to the terminal, and the second entity may further send an RB release request to the first entity, where the RB release request includes one or more of the following information: an identifier of a to-be-released terminal, a serving cell identifier of the to-be-released terminal, and information about a to-be-released RB. After receiving the release request, the first entity releases, based on the release request, an RB of the terminal corresponding to the identifier of the to-be-released terminal in a cell corresponding to the serving cell identifier, and sends a release response to the second entity. If the second entity determines that after an RB of another terminal is released, the second entity can set up an RB to a terminal that requests setup of the RB, the second entity sends, to the first entity, an indication indicating that setup of the RB is allowed.

In the foregoing embodiment, an initial access procedure of the terminal is completed. After the foregoing access procedure of the terminal is completed, the terminal may further need to be handed over due to a reason such as movement of the terminal.

When the second entity determines that the terminal needs to continue to be handed over, the second entity may send a handover indication to the first entity, and the handover indication is used to request to hand over the terminal to a neighboring CU-CP. After receiving the handover indication, the first entity triggers a handover procedure of the terminal according to the handover indication.

Optionally, after receiving a measurement report of the terminal, the second entity may determine, based on the measurement report, that the terminal needs to be handed over. Specifically, the first entity may receive the measurement report sent by the terminal, and send the measurement report to the second entity. When determining, based on the received measurement report, that current communication quality of the terminal is poor, the second entity may hand over the terminal, and send the handover indication to the first entity.

Further, the foregoing measurement reporting procedure of the terminal may be actively triggered by the first entity to report. The first entity may alternatively initiate the measurement reporting procedure to the terminal after receiving the indication sent by the second entity (the indication is used to indicate the first entity to send the measurement report of the terminal).

Optionally, the handover indication includes one or more of the following information: an identifier of a to-be-handed-over terminal, an identifier of a target cell, and target frequency information.

In a possible implementation, the first entity may further send a cell congestion status report to the second entity. If the report indicates that a cell is currently in a congested state, the second entity determines, based on an RRM algorithm, a relieving policy (for example, release of a low-priority GBR and release of an edge user) for relieving the congestion state of the cell, and sends a cell congestion relieve request to the first entity, where the request includes the determined relieving policy. The first entity may perform relieving processing based on the relieving policy.

The cell congestion status report includes one or more of the following information: a cell identifier, a bearer type (for example, a GBR or a non-GBR), an ARP, a congestion type (for example, GBR congestion or non-GBR congestion), a congestion level (for example, severe, moderate, or not congested), and the like.

In a specific implementation, when receiving configuration update information sent by the DU, the first entity may send the cell congestion status report to the second entity after determining, based on the configuration update information, that a cell managed by the first entity may be in a congestion state.

In a possible implementation, the first entity may further send a cell status report to the second entity, and the second entity may further determine, based on the cell status report, whether to perform load balancing. The cell status report includes one or more of the following information: an identifier of a cell, a quantity of terminals in the cell, a downlink capacity of the cell, uplink and downlink physical resource block usage of the cell, uplink and downlink physical resource block usage of a guaranteed bit rate of the cell, uplink and downlink physical resource block usage of a non-guaranteed bit rate of the cell, a hardware load level, and a transmission load level.

The second entity determines a load status of the cell based on the foregoing information, and whether load balancing needs to be performed. If the second entity determines that load balancing needs to be performed, the second entity may send a request of obtaining information about a neighboring cell to the first entity, and the first entity sends the information about the neighboring cell to the second entity. After obtaining the information about the neighboring cell, the second entity determines a target cell in load balancing based on a load status of the neighboring cell.

The information about the neighboring cell includes one or more of the following information: a serving cell identifier, an identifier of the neighboring cell, a quantity of terminals in the neighboring cell, uplink and downlink physical resource block usage of the neighboring cell, uplink and downlink physical resource block usage of a guaranteed bit rate of the neighboring cell, uplink and downlink physical resource block usage of a non-guaranteed bit rate of the neighboring cell, a hardware load level of the neighboring cell, and a transmission load level of the neighboring cell.

After receiving the information about the neighboring cell that is sent by the first entity, the second entity may determine a load balancing policy for an idle-mode terminal, and send a terminal release control message to the first entity, to perform load balancing on the idle-mode terminal. The first entity performs reselection priority control based on the terminal release control message.

The terminal release control message includes one or more of the following information: an identifier of a cell, a quantity of to-be-released terminals, a frequency on which camping is preferentially performed, and the like. The terminal release control message is used by the idle-mode terminal to perform cell reselection.

In addition, the second entity may further determine a load balancing policy for a connected-mode terminal, and send a terminal selection policy control message to the first entity, where the terminal selection policy control message includes one or more of the following information: an identifier of a cell, a quantity of connected-mode terminals to be triggered to perform measurement, and frequency information whose measurement is to be triggered, and the information is used to perform load balancing on the connected-mode terminal.

The first entity triggers, based on the terminal selection policy control message, the terminal to perform measurement, and after receiving the measurement report sent by the terminal, the first entity sends a terminal selection result report to the second entity, where the terminal selection result report includes one or more of the following information: an identifier of a cell, a terminal list, and the measurement report of the terminal.

The second entity determines a to-be-handed-over terminal based on the terminal selection result report, in other words, determines a terminal that meets a handover condition, and sends a handover control message to the first entity; and the first entity triggers, based on the handover control message, a handover procedure for the terminal that meets the handover condition. The handover control message includes one or more of the following information: a serving cell identifier, an identifier of the terminal that meets the handover condition, and a list of target neighboring cells.

For clearer understanding of the foregoing embodiment of this application, examples are provided below for description with reference to FIG. 5A to FIG. 8B.

Figure 5A:
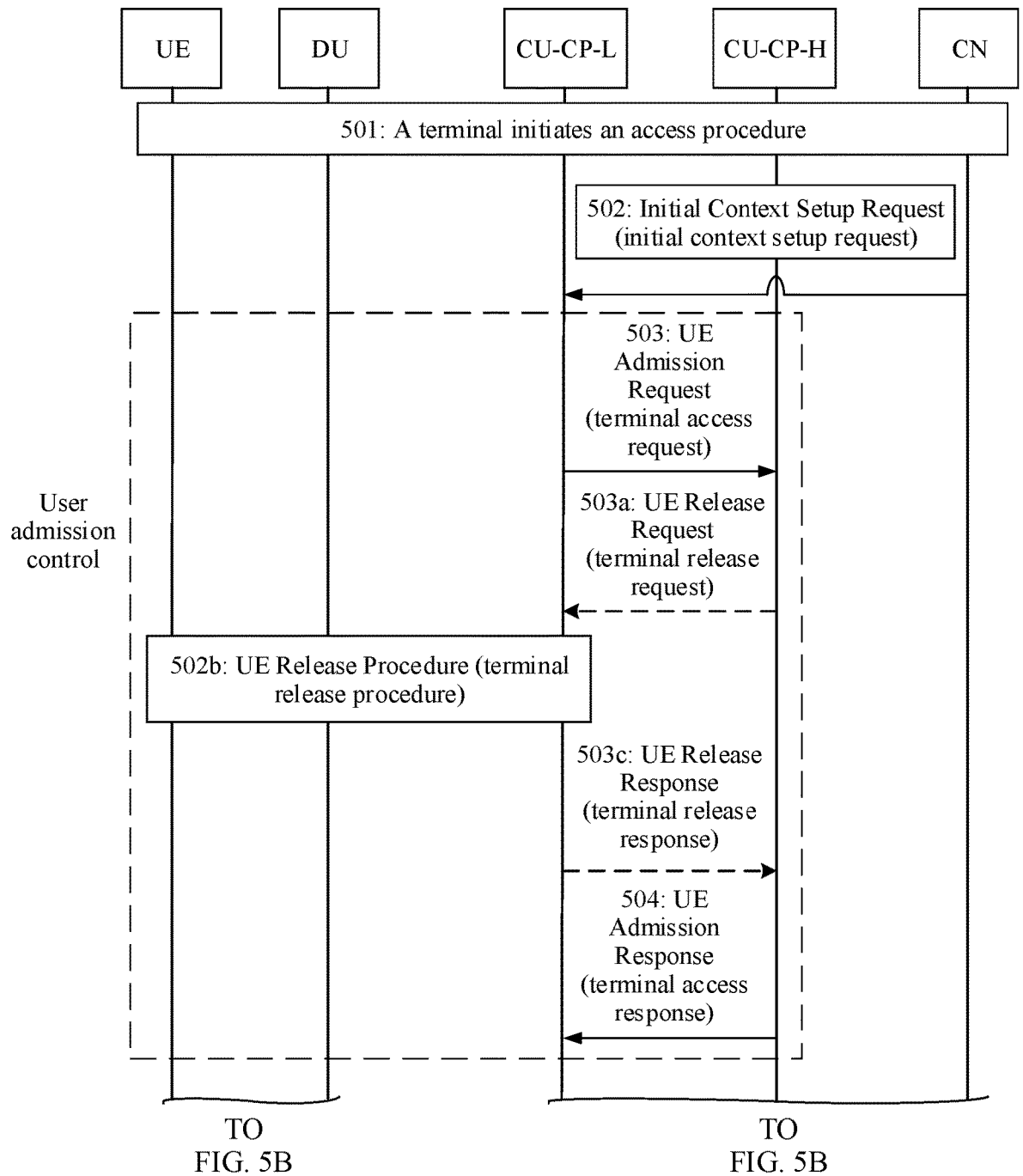
FIG. 5A and FIG. 5B are a schematic diagram of a terminal access procedure according to an embodiment of this application.
Figure 5B:
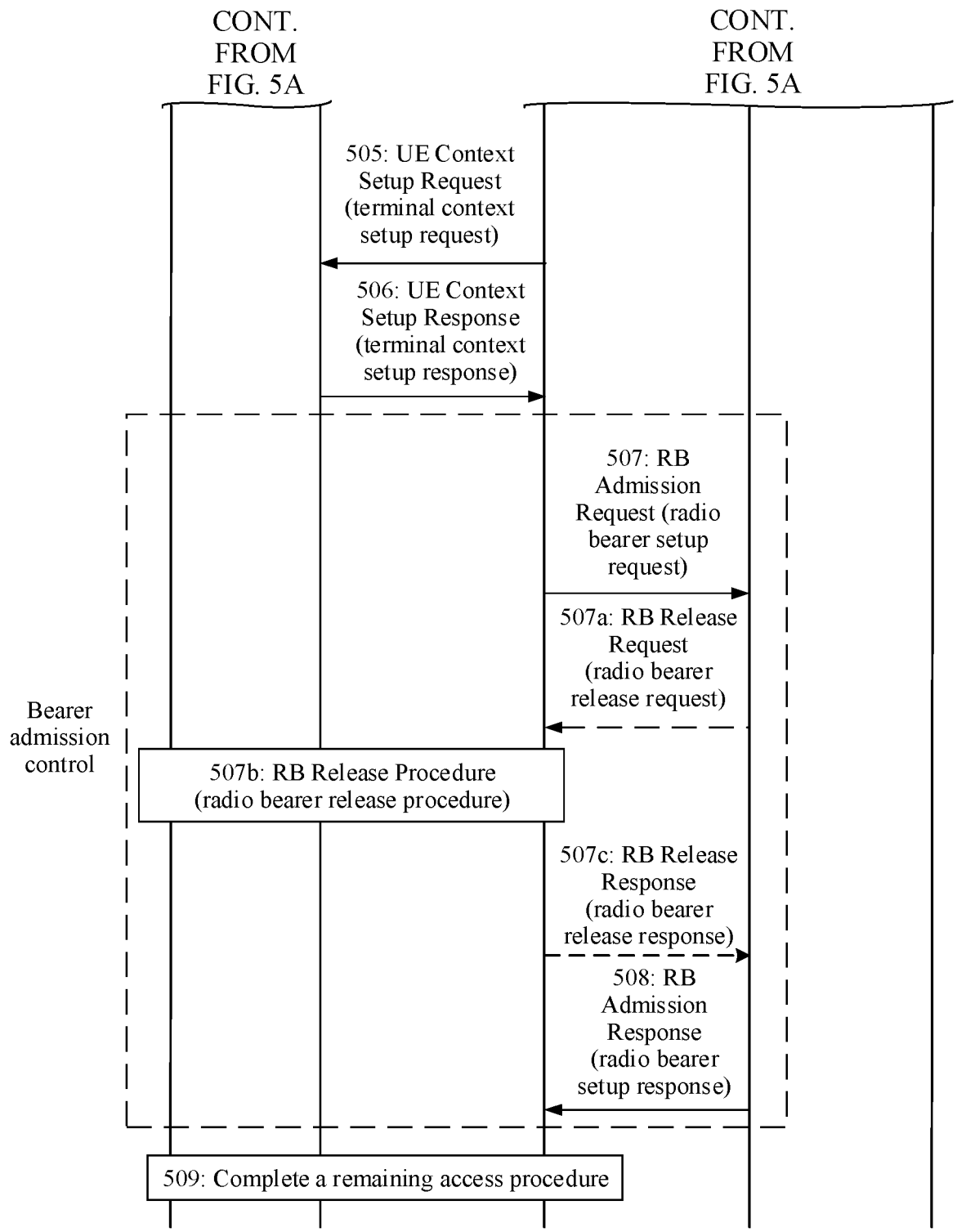

FIG. 5A and FIG. 5B show an access procedure of a terminal when the CU-CP architecture provided in the embodiment of this application is applied. The procedure specifically includes the following steps.

Step 501: A terminal 1 initiates an initial access procedure. For this procedure, refer to an existing communication standard. Details are not described herein.

Step 502: A core network sends an initial context setup request to a first entity (CU-CP-L) in a CU-CP, where the request includes context and the like of the terminal 1.

Step 503: The first entity sends a terminal access request (UE admission request) to a second entity. The request may carry one or more of the following information: an identifier of the terminal 1, a bearer type of the terminal 1, an ARP of the terminal 1, a synchronization status of the terminal 1, a quantity of terminals that access a base station (to be specific, a base station to which the CU-CP belongs), a cell identifier (such as a cell global identifier (E-UTRAN cell global identifier, ECGI)), a quantity of terminals that access each cell, and the like.

If the second entity determines, based on the request, to allow access of the terminal, step 504 is performed. If the second entity determines that currently there are a relatively small quantity of allocable resources, the second entity needs to release a resource of another terminal before allowing access of the terminal, and step 503*a* to step 503*c* are performed.

Step 503*a*: The second entity sends a terminal release request (UE release request) to the first entity, where the request includes an identifier of a to-be-released terminal and/or a serving cell identifier of the to-be-released terminal.

Step 503*b*: The first entity triggers the foregoing resource release procedure. For this procedure, refer to an existing communication standard. Details are not described herein.

Step 503*c*: The first entity sends a terminal release response (UE release response) to the second entity, to notify the second entity of whether release succeeds.

Step 504: The second entity sends a terminal access response to the first entity, to notify the first entity of whether access of the terminal 1 is allowed. The response may include the identifier of the terminal 1, a serving cell identifier of the terminal 1, and indication information indicating whether access is allowed.

If access of the terminal 1 is allowed, the following steps are continued. Otherwise, this procedure ends.

Step 505: The first entity sends a terminal context setup request (UE context setup request) to a DU, to indicate the DU to configure a resource or the like for the terminal.

Step 506: The DU returns a terminal context setup response (UE context setup response) to the first entity.

Step 507: The first entity sends a radio bearer setup request (RB admission request) to the second entity. The request may include one or more of the following information: the identifier of the terminal 1, the serving cell identifier of the terminal 1, a type of the terminal 1, an air interface resource application result, radio bearer information of the DU, and the like.

If the second entity determines, based on the request, to set up a radio bearer to the terminal 1, step 508 is performed. If the second entity determines that a radio bearer of another terminal needs to be released before a radio bearer can be set up to the terminal 1, step 507*a* to step 507*c* are performed.

Step 507*a*: The second entity sends a radio bearer release request (RB release request) to the first entity, where the request includes one or more of the following information: an identifier of a to-be-released terminal, a serving cell identifier of the to-be-released terminal, and information about a to-be-released radio bearer.

Step 507*b*: The first entity triggers the foregoing radio bearer release procedure. For this procedure, refer to an existing communication standard. Details are not described herein.

Step 507*c*: The first entity sends a terminal release response (UE release response) to the second entity, to notify the second entity whether release succeeds, where the response may include the following information: the identifier of the to-be-released terminal, the serving cell identifier of the to-be-released terminal, the information about the to-be-released radio bearer, and a release result.

Step 508: The second entity sends a radio bearer setup response (RB admission response) to the first entity, to indicate the first entity to configure a radio bearer for the terminal 1, where the response may include the following information: the identifier of the terminal 1, the serving cell identifier of the terminal 1, radio bearer configuration information, an admission result, and the like.

Step 509: The first entity completes radio bearer configuration based on the radio bearer setup response.

Figure 6:
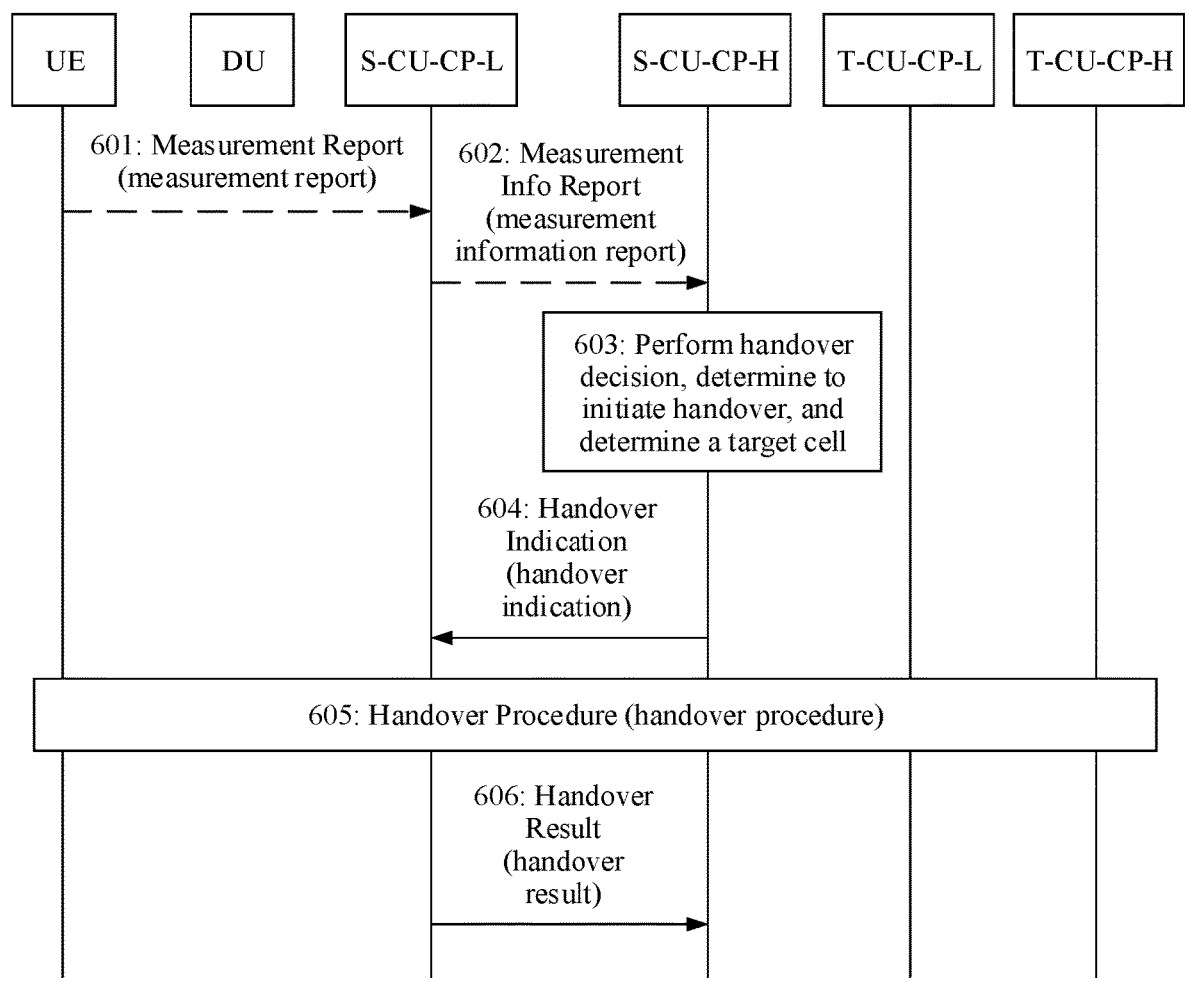
FIG. 6 is a schematic diagram of a terminal handover procedure according to an embodiment of this application.

FIG. 6 shows a handover procedure of a terminal when the CU-CP architecture provided in the embodiment of this application is applied. The procedure specifically includes the following steps.

Step 601: After being triggered for measurement reporting, a terminal sends a measurement report to a first entity (S-CU-CP-L) in a source CU-CP.

Step 602: The S-CU-CP-L sends the received measurement report to a second entity (S-CU-CP-H) in the source CU-CP by using a measurement information report (measurement info report).

Step 603: The S-CU-CP-H determines, based on a handover factor, whether the terminal 1 needs to be handed over, and if the terminal 1 needs to be handed over, further determines a target cell or a target frequency to which the terminal 1 is to be handed over. The handover factor may include one or more of the following factors: a measurement report, a service type, a distance between a source base station of the terminal 1 (a base station to which the source CU-CP belongs) and another base station, a frequency priority, and the like.

Step 604: The S-CU-CP-H sends a handover indication to the S-CU-CP-L, where the indication may include one or more of the following information: an identifier of the terminal 1, information about a target cell, information about a target frequency, and the like.

Step 605: The S-CU-CP-L triggers to hand over the terminal 1. For this procedure, refer to an existing communication standard. Details are not described herein.

Step 606: The S-CU-CP-L sends a handover result to the S-CU-CP-H, to notify the S-CU-CP-H of whether the terminal 1 is successfully handed over, where the handover result may include one or more of the following information: the identifier of the terminal 1, the information about the target cell, the information about the target frequency, the handover result, and the like.

Step 601 and step 602 are optional steps, in other words, step 601 and step 602 may be not performed. The S-CU-CP-H may determine, based on another handover factor other than the measurement report, whether the terminal 1 needs to be handed over.

Figure 7:
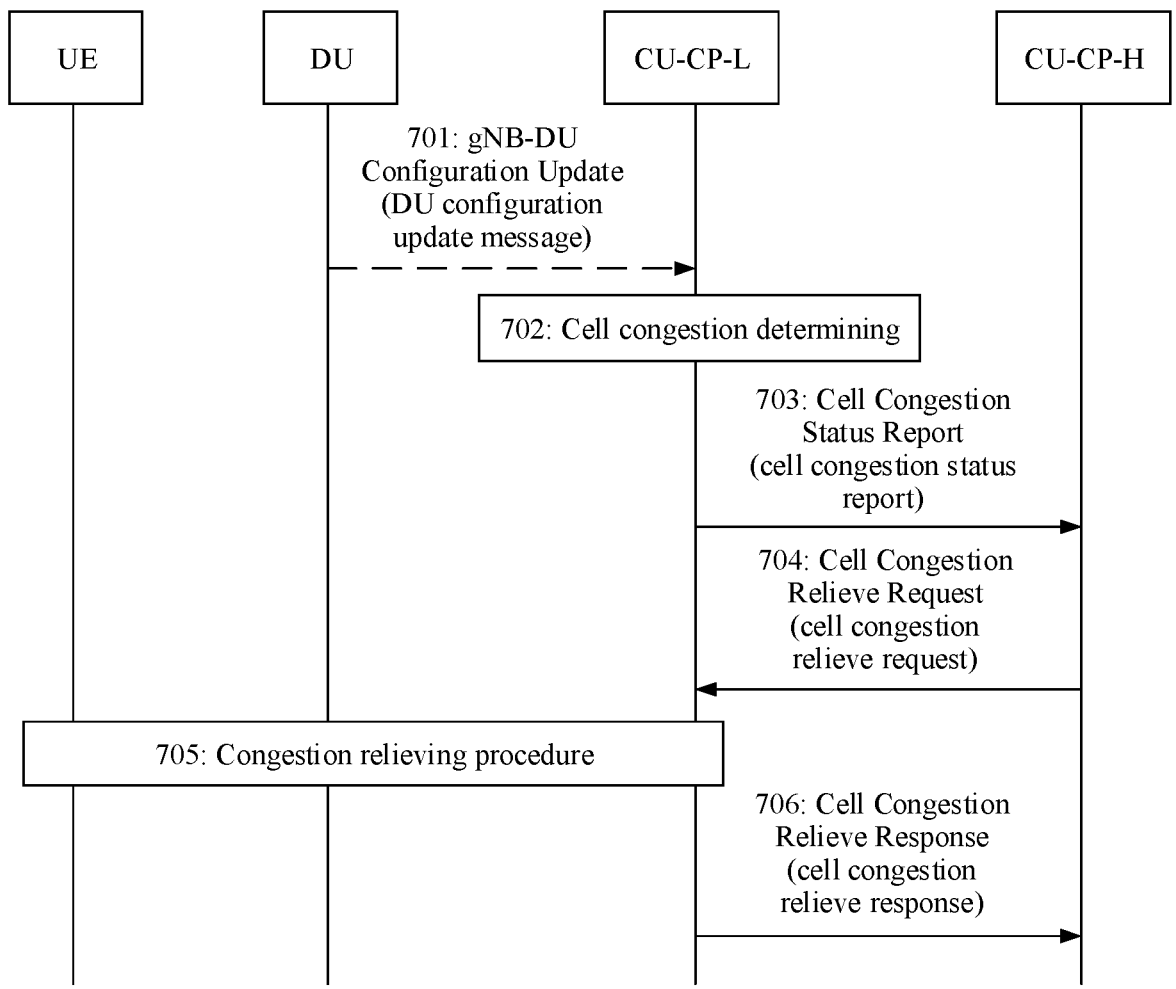
FIG. 7 is a schematic diagram of a cell congestion relieving procedure according to an embodiment of this application.

FIG. 7 shows a cell congestion relieving procedure when the CU-CP architecture provided in the embodiment of this application is applied. The procedure specifically includes the following steps.

Step 701: A DU sends a DU configuration update message (gNB-DU configuration update) to a first entity (CU-CP-L) in a CU-CP.

Step 702: The DU determines, based on the DU configuration update message or other information reported by the DU, that there is a cell that is in a congested state and on which congestion relieving needs to be performed.

Step 703: The first entity sends a cell congestion status report to a second entity (CU-CP-H), where the report may include one or more of the following information: an identifier of the cell in which congestion occurs, a type of a bearer on which congestion occurs (for example, a guaranteed bit rate (GBR) or a non-guaranteed bit rate (non-GBR)), an ARP, a congestion level (for example, severe, moderate, or not congested), and the like.

Step 704: The second entity determines a congestion relieving policy based on the received report, and sends the determined relieving policy to the first entity by using a cell congestion relieve request.

Step 705: The first entity performs congestion relieving processing based on the relieving policy. For this procedure, refer to an existing communication standard. Details are not described herein.

Step 706: The first entity sends a cell congestion relieve response to the second entity, to notify the second entity of a congestion relieving result.

Step 701 is an optional step, in other words, step 701 may be not performed, and the first entity may determine, based on other information, whether there is a cell that is in a congested state.

Figure 8A:
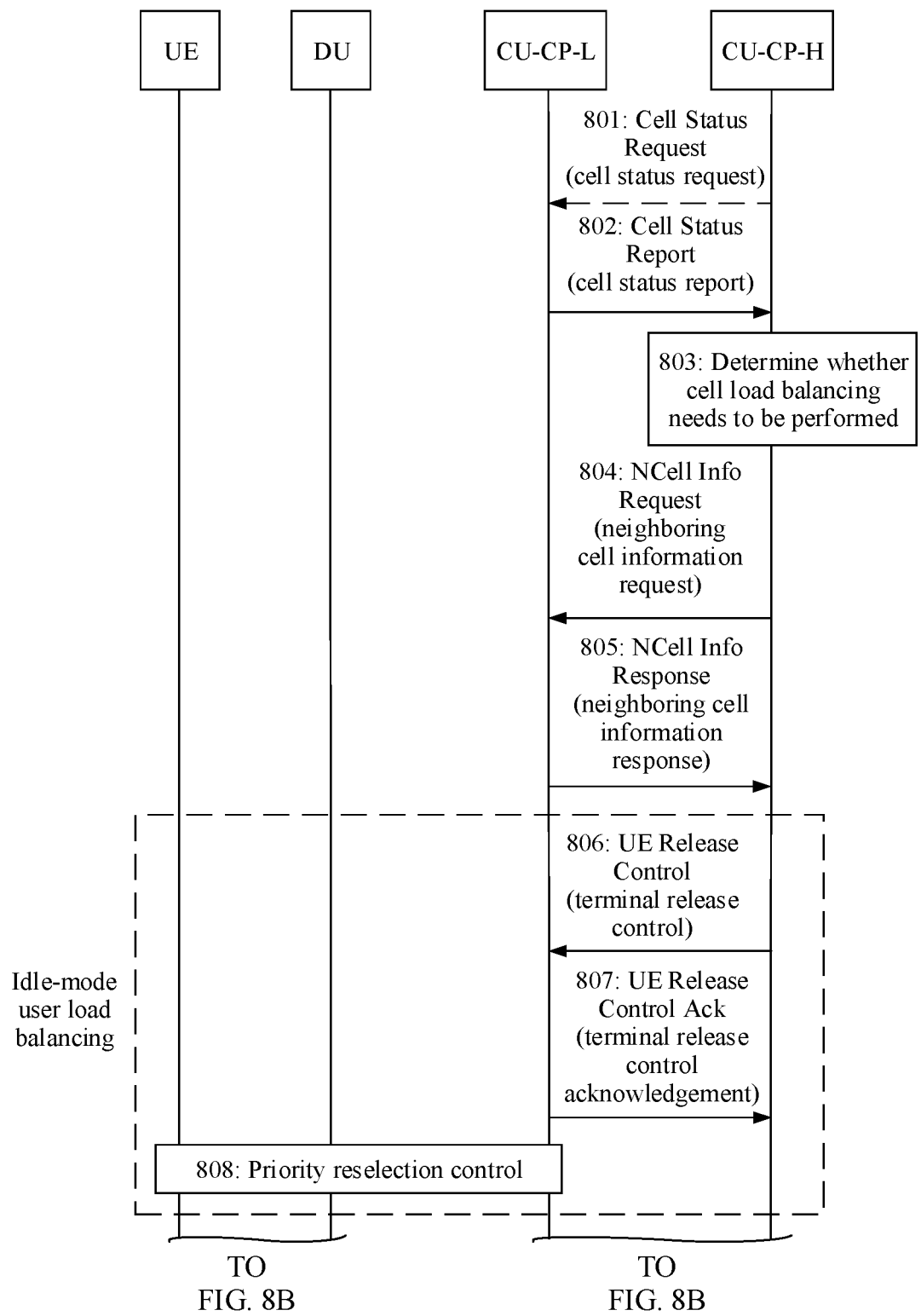
FIG. 8A and FIG. 8B are a schematic diagram of a load balancing procedure according to an embodiment of this application.
Figure 8B:
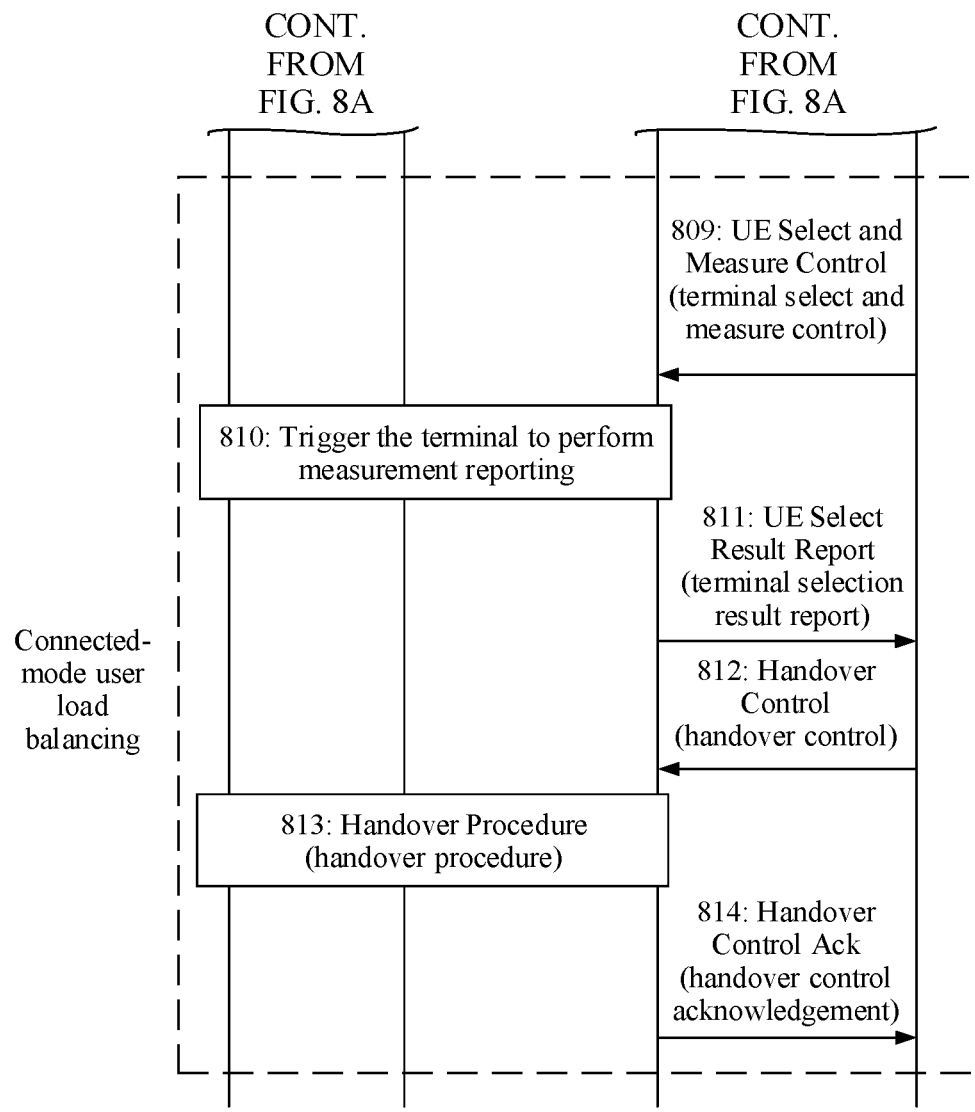

FIG. 8A and FIG. 8B show a load balancing procedure when the CU-CP architecture provided in the embodiment of this application is applied. The procedure specifically includes the following steps.

Step 801: A second entity (CU-CP-H) in a CU-CP sends a cell status request message to a first entity (CU-CP-L) in the CU-CP, to request to obtain status information of a cell, where the request may include information such as an identifier of the cell, to indicate that status information of a specific cell is requested to be obtained.

Step 802: The first entity sends a cell status report to the second entity, where the report may include one or more of the following information: an identifier of the cell, a quantity of terminals in each cell, a downlink capacity of the cell, uplink and downlink physical resource block usage of the cell, uplink and downlink physical resource block usage of a guaranteed bit rate of the cell, uplink and downlink physical resource block usage of a non-guaranteed bit rate of the cell, a hardware load level, a transmission load level, and the like.

Step 803: The second entity determines, based on the foregoing report, whether cell load balancing needs to be performed; and if it is determined that cell load balancing needs to be performed, continues to perform the following steps; or otherwise, this procedure ends.

Step 804: The second entity sends a neighboring cell information request (NCell info request) to the first entity, where the request may include an identifier of a cell on which load balancing needs to be performed, so that the first entity reports information about a neighboring cell of the cell on which load balancing needs to be performed.

Step 805: The first entity determines the information about the neighboring cell, and reports the determined information about the neighboring cell to the second entity by using a neighboring cell response (NCell info response). The response may include one or more of the following information: an identifier of the cell on which load balancing needs to be performed, an identifier of the neighboring cell, a quantity of terminals in the neighboring cell, uplink and downlink physical resource block usage of the neighboring cell, uplink and downlink physical resource block usage of a guaranteed bit rate of the neighboring cell, uplink and downlink physical resource block usage of a non-guaranteed bit rate of the neighboring cell, a hardware load level of the neighboring cell, a transmission load level of the neighboring cell, and the like.

If the second entity determines, based on the obtained information, to perform idle-mode terminal load balancing for the cell on which load balancing needs to be performed, step 806 to step 808 are performed, to control whether the terminal needs to be reselected to a cell with relatively low load. If it is determined to perform connected-mode terminal load balancing, step 809 to step 814 are performed, to control handover of a connected-mode terminal to a cell with relatively low load.

Step 806: The second entity sends a terminal release control (UE release control) message to the first entity, where the message may include an identifier of a cell, a quantity of to-be-released terminals, frequency priority information, and the like.

Step 807: The first entity sends a terminal release control acknowledgement (UE release control ack) to the second entity.

Step 808: The first entity performs reselection priority control based on the terminal release control message when a terminal is released.

Step 809: The second entity sends a terminal select and measure control (UE select and measure control) message to the first entity, where the message may include information such as the identifier of the cell, the quantity of connected-mode terminals, and a frequency, so that the first entity triggers a specific quantity of terminals to perform measurement reporting.

Step 810: The first entity triggers the specific quantity of terminals to perform measurement reporting.

Step 811: After receiving a measurement report of the terminal, the first entity sends a terminal selection result report (UE select report) to the second entity, where the report may include the identifier of the cell, a terminal list, a measurement report corresponding to each terminal, and the like.

Step 812: The second entity determines, based on the received information, a terminal that needs to be handed over and a target cell to which the terminal is to be handed over, and sends a handover control message to the first entity, where the message may include an identifier of the terminal, a serving cell identifier, a target cell list, and the like.

Step 813: The first entity triggers a terminal handover procedure based on the handover control message. For this procedure, refer to an existing communication standard. Details are not described herein.

Step 814: The first entity returns a handover control acknowledgement (handover control ack) message to the second entity.

An execution sequence of step 813 and an execution sequence of step 814 may be interchanged. This is not limited in this embodiment of this application.

It should be understood that names of messages such as "access request of a terminal" and "radio bearer setup request" that are used in the embodiments of this application are used to distinguish messages and briefly express purposes of the messages. In actual application, various messages may also use other names. This is not limited in the embodiments of this application.

Figure 9:
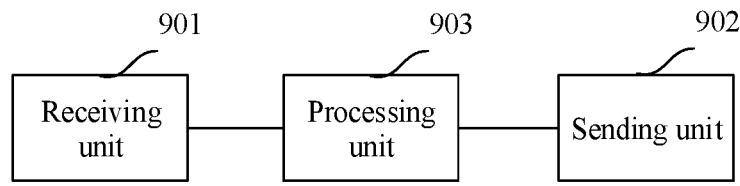
FIG. 9 is a schematic structural diagram 1 of a first entity in a CU-CP according to an embodiment of this application.

Based on a same technical concept, an embodiment of this application further provides a first entity in a CU-CP, configured to implement functions performed by the first entity in the foregoing method embodiment. As shown in FIG. 9, the first entity may include a receiving unit 901, a sending unit 902, and a processing unit 903. The receiving unit 901 is configured to perform a receiving function of the first entity in the foregoing method embodiment, the sending unit 902 is configured to perform a sending function of the first entity in the foregoing method embodiment, and another function of the first entity is performed by the processing unit 903.

Figure 10:
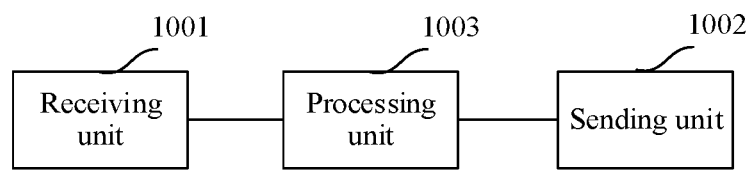
FIG. 10 is a schematic structural diagram 1 of a second entity in a CU-CP according to an embodiment of this application.

Based on a same technical concept, an embodiment of this application further provides a second entity in a CU-CP, configured to implement functions performed by the second entity in the foregoing method embodiment. As shown in FIG. 10, the second entity may include a receiving unit 1001, a sending unit 1002, and a processing unit 1003. The receiving unit 1001 is configured to perform a receiving function of the second entity in the foregoing method embodiment, the sending unit 1002 is configured to perform a sending function of the second entity in the foregoing method embodiment, and another function of the second entity is performed by the processing unit 1003.

It should be noted that the foregoing unit division is merely logical function division. In actual implementation, all or some of the units may be integrated into a same physical entity, or may be physically separated. In addition, all these units may be implemented in a form of software by invoking a processing element; or all these units may be implemented in a form of hardware; or some units may be implemented in a form of software by invoking a processing element, and some units are implemented in a form of hardware. For example, the receiving unit and the sending unit may be integrated, or may be independently implemented. The processing element herein may be an integrated circuit and has a signal processing capability. In an implementation process, steps in the foregoing methods or the foregoing units can be implemented by using a hardware integrated logical circuit in the processing element, or by using instructions in a form of software. In addition, the foregoing sending unit is a control sending unit, and may send information by using a sending apparatus such as an antenna and a radio frequency apparatus. Similarly, the receiving unit may also receive information by using a receiving apparatus such as an antenna and a radio frequency apparatus.

The foregoing units may be one or more integrated circuits configured to implement the foregoing methods, for example, one or more application-specific integrated circuits (ASIC), one or more microprocessors, or one or more field programmable gate arrays (FPGA). For another example, when a specific unit in the foregoing units is implemented in a form of a processing element by invoking a program, the processing element may be a general purpose processor, such as a central processing unit (CPU) or another processor that can invoke a program. For another example, these units may be integrated and implemented in a form of a system-on-a-chip (SOC).

Figure 11:
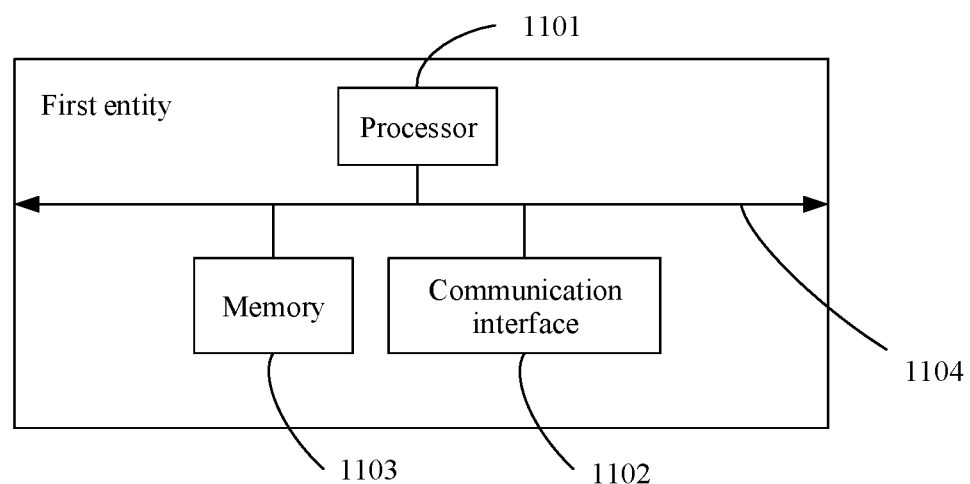
FIG. 11 is a schematic structural diagram 2 of a first entity in a CU-CP according to an embodiment of this application.

Based on a same technical concept, an embodiment of this application further provides a first entity in a CU-CP, configured to implement functions performed by the first entity in the foregoing method embodiment. As shown in FIG. 11, the first entity may include a processor 1101 and a communication interface 1102, and may further include a memory 1103 and a communication bus 1104.

Specifically, the processor 1101 may be a general-purpose CPU, a microprocessor, an ASIC, or one or more integrated circuits configured to control program execution of the solution in this application.

The communication interface 1102 is configured to communicate with another device or a communication network such as an Ethernet, a radio access network (RAN), or a wireless local area network (WLAN) by using any apparatus such as a transceiver.

The communication bus 1104 may include a channel for transmitting information between the foregoing components.

The memory 1103 may be a read-only memory (ROM) or another type of static storage device that can store static information and instructions, a random access memory (random access memory, RAM) or another type of dynamic storage device that can store information and instructions, an electrically erasable programmable read-only memory (EEPROM) or any other medium that can be used to carry or store expected program code in a form of instructions or a data structure and that can be accessed by a computer, but is not limited thereto. The memory 1103 may exist independently, for example, is an off-chip memory, and is connected to the processor 1101 by using the communication bus 1104. The memory 1103 may be alternatively integrated with the processor 1101.

The communication interface 1102 is responsible for communicating with the another device or the communication network, and the processor 1101 is configured to implement another function in the communication method provided in the foregoing embodiment of this application.

In specific implementation, in an embodiment, the processor 1101 may include one or more CPUs.

In specific implementation, in an embodiment, the terminal may include a plurality of processors. Each of these processors may be a single-core processor, or may be a multi-core processor. The processor herein may be one or more devices, circuits, and/or processing cores used for processing data (for example, a computer program instruction).

The processor 1101 may invoke a program stored in the memory 1103, to perform the following steps:
  sending an access request of a terminal to a second entity in a CU-CP through the communication interface 1102;
  receiving, through the communication interface 1102, an access response sent by the second entity;
  if the access response indicates that access of the terminal is allowed, sending a radio bearer setup request to the second entity through the communication interface 1102;
  receiving, through the communication interface 1102, a radio bearer setup response sent by the second entity; and
  if the setup response indicates that setup of an RB to the terminal is allowed, triggering setup of the RB to the terminal.

In a possible implementation, the access request further includes one or more of the following information: a quantity of terminals that access a base station to which the first entity belongs, identifiers of one or more cells covered by the base station, and a quantity of terminals that access the one or more cells.

In a possible implementation, the processor 1101 is further configured to: after sending the access request of the terminal to the second entity through the communication interface 1102, receive, through the communication interface 1102, a release request sent by the second entity, where the release request includes an identifier of another terminal and a serving cell identifier of the another terminal; and release a resource of the another terminal based on the release request.

In a possible implementation, the radio bearer access request includes RB information that is obtained from a distributed unit DU and managed by the DU.

In a possible implementation, the processor 1101 is further configured to: after sending the radio bearer setup request to the second entity through the communication interface 1102, receive, through the communication interface 1102, an RB release request sent by the second entity, where the RB release request includes one or more of the following information: an identifier of a to-be-released terminal, a serving cell identifier of the to-be-released terminal, and information about a to-be-released RB; and release an RB of the to-be-released terminal based on the release request.

In a possible implementation, the processor 1101 is further configured to: receive, through the communication interface 1102, a handover indication sent by the second entity, where the handover indication is used to request to hand over a terminal that accesses the second entity to a second entity in a neighboring CU-CP; and hand over, according to the handover indication, the terminal that accesses the second entity to the second entity in the neighboring CU-CP.

In a possible implementation, the processor 1101 is further configured to: before receiving, through the communication interface 1102, the handover indication sent by the second entity, receive, through the communication interface 1102, a measurement report sent by the terminal; and send the measurement report to the second entity through the communication interface 1102.

In a possible implementation, the handover request includes one or more of the following information: an identifier of a to-be-handed-over terminal, an identifier of a target cell, and target frequency information.

In a possible implementation, the processor 1101 is further configured to: send a cell congestion status report to the second entity through the communication interface 1102; receive, through the communication interface 1102, a cell congestion relieve request sent by the second entity, where the request includes a relieving policy; and perform congestion relieving processing based on the relieving policy.

In a possible implementation, the processor 1101 is further configured to: before sending the cell congestion status report to the second entity through the communication interface 1102, receive, through the communication interface 1102, configuration update information sent by the DU; and determine, based on the configuration update information, cell congestion managed by the first entity.

In a possible implementation, the cell congestion status report includes one or more of the following information: an identifier of a cell, a bearer type, an ARP, a congestion type, and a congestion level.

In a possible implementation, the processor 1101 is further configured to: send a cell status report to the second entity through the communication interface 1102, so that the second entity determines, based on the cell status report, whether to perform load balancing.

In a possible implementation, the cell status report includes one or more of the following information: an identifier of a cell, a quantity of terminals in the cell, a downlink capacity of the cell, uplink and downlink physical resource block usage of the cell, uplink and downlink physical resource block usage of a guaranteed bit rate of the cell, uplink and downlink physical resource block usage of a non-guaranteed bit rate of the cell, a hardware load level, and a transmission load level.

In a possible implementation, if the second entity determines to perform load balancing, the processor 1101 is further configured to: receive, through the communication interface 1102, a request sent by the second entity for obtaining information about a neighboring cell; send the information about the neighboring cell to the second entity through the communication interface 1102; receive, through the communication interface 1102, a terminal release control message sent by the second entity; and perform reselection priority control based on the terminal release control message.

In a possible implementation, the information about the neighboring cell includes one or more of the following information: a serving cell identifier, an identifier of the neighboring cell, a quantity of terminals in the neighboring cell, uplink and downlink physical resource block usage of the neighboring cell, uplink and downlink physical resource block usage of a guaranteed bit rate of the neighboring cell, uplink and downlink physical resource block usage of a non-guaranteed bit rate of the neighboring cell, a hardware load level of the neighboring cell, and a transmission load level of the neighboring cell.

In a possible implementation, the terminal release control message includes one or more of the following information: an identifier of a cell, a quantity of to-be-released terminals, and a frequency on which camping is preferentially performed.

In a possible implementation, the processor 1101 is further configured to: after sending the information about the neighboring cell to the second entity through the communication interface 1102, receive, through the communication interface 1102, a terminal selection policy control message sent by the second entity, where the terminal selection policy control message includes one or more of the following information: an identifier of a cell, a quantity of connected-mode terminals to be triggered to perform measurement, and frequency information whose measurement is to be triggered; trigger, based on the terminal selection policy control message, the terminal to perform measurement; after receiving the measurement report from the terminal through the communication interface 1102, send a terminal selection result report to the second entity, where the terminal selection result report includes one or more of the following information: an identifier of a cell, a terminal list, and the measurement report of the terminal, so that the second entity determines a to-be-handed-over terminal based on the terminal selection result report; receive, through the communication interface 1102, a handover control message sent by the second entity; and hand over the terminal based on the handover control message.

In a possible implementation, the handover control message includes one or more of the following information: a serving cell identifier, an identifier of the terminal, and a list of target neighboring cells.

Figure 12:
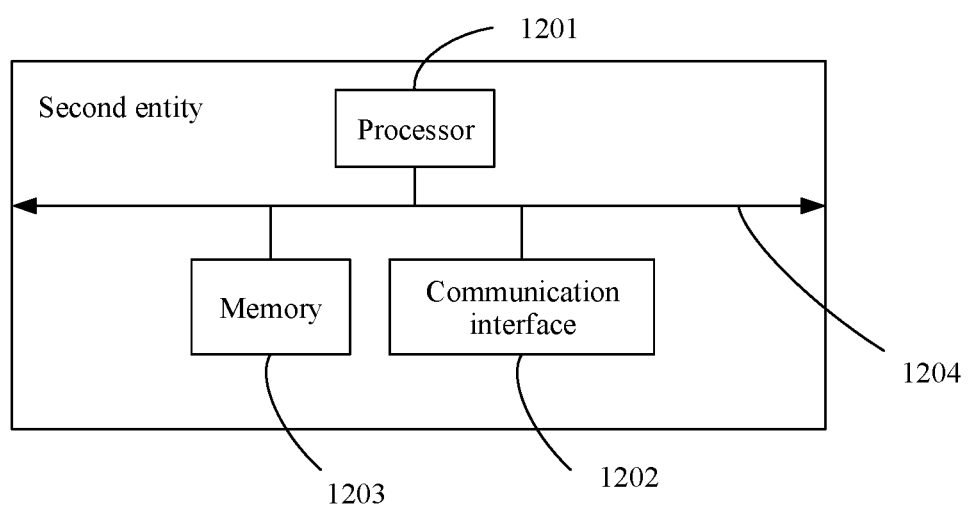
FIG. 12 is a schematic structural diagram 2 of a second entity in a CU-CP according to an embodiment of this application.

Based on a same technical concept, an embodiment of this application further provides a second entity in a CU-CP, configured to implement functions performed by the second entity in the foregoing method embodiment. As shown in FIG. 12, the second entity may include a processor 1201 and a communication interface 1202, and may further include a memory 1203 and a communication bus 1204.

Specifically, the processor 1201 may be a general-purpose CPU, a microprocessor, an ASIC, or one or more integrated circuits configured to control program execution of the solution in this application.

The communication interface 1202 is configured to communicate with another device or a communication network such as an Ethernet, a radio access network (RAN), or a wireless local area network (WLAN) by using any apparatus such as a transceiver.

The communication bus 1204 may include a channel for transmitting information between the foregoing components.

The memory 1203 may be a read-only memory (ROM) or another type of static storage device that can store static information and instructions, a random access memory (RAM) or another type of dynamic storage device that can store information and instructions, an electrically erasable programmable read-only memory (EEPROM) or any other medium that can be used to carry or store expected program code in a form of instructions or a data structure and that can be accessed by a computer, but is not limited thereto. The memory 1203 may exist independently, for example, is an off-chip memory, and is connected to the processor 1201 by using the communication bus 1204. The memory 1203 may be alternatively integrated with the processor 1201.

The communication interface 1202 is responsible for communicating with the another device or the communication network, and the processor 1201 is configured to implement another function in the communication method provided in the foregoing embodiment of this application.

In specific implementation, in an embodiment, the processor 1201 may include one or more CPUs.

In specific implementation, in an embodiment, the terminal may include a plurality of processors. Each of these processors may be a single-core processor, or may be a multi-core processor. The processor herein may be one or more devices, circuits, and/or processing cores used for processing data (for example, a computer program instruction).

The processor 1201 may invoke a program stored in the memory 1203, to perform the following steps:
  receiving, through the communication interface 1202, an access request of a terminal that is sent by a first entity in a CU-CP;
  determining, based on the access request, whether to allow access of the terminal, and sending an access response to the first entity through the communication interface 1202;
  if the access response indicates that access of the terminal is allowed, receiving, through the communication interface 1202, a radio bearer setup request sent by the first entity; and
  determining whether setup of a radio bearer RB to the terminal is allowed, and sending a radio bearer setup response to the first entity through the communication interface 1202, so that the first entity triggers setup of the RB to the terminal.

In a possible implementation, the access request further includes one or more of the following information: a quantity of terminals that access a base station to which the first entity belongs, identifiers of one or more cells covered by the base station, and a quantity of terminals that access the one or more cells.

In a possible implementation, the processor 1201 is further configured to: after receiving, through the communication interface 1202, the access request of the terminal that is sent by the first entity, send a release request to the first entity through the communication interface 1202, where the release request includes an identifier of another terminal and a serving cell identifier of the another terminal, so that the first entity releases a resource of the another terminal based on the release request.

In a possible implementation, the radio bearer access request includes RB information that is obtained from a distributed unit DU and managed by the DU.

In a possible implementation, the processor 1201 is further configured to: after receiving, through the communication interface 1202, the radio bearer setup request sent by the first entity, send an RB release request to the first entity through the communication interface 1202, so that the first entity releases an RB of the to-be-released terminal based on the release request, where the RB release request includes one or more of the following information: an identifier of the to-be-released terminal, a serving cell identifier of the to-be-released terminal, and information about a to-be-released RB.

In a possible implementation, the processor 1201 is further configured to: send a handover indication to the first entity through the communication interface 1202, where the handover indication is used to request to hand over a terminal that accesses the second entity to a second entity in a neighboring CU-CP, so that the first entity hands over, according to the handover indication, the terminal that accesses the second entity to the second entity in the neighboring CU-CP.

In a possible implementation, the processor 1201 is further configured to: before sending the handover indication to the first entity through the communication interface 1202, receive, through the communication interface 1202, a measurement report of the terminal that is sent by the first entity.

In a possible implementation, the handover request includes one or more of the following information: an identifier of a to-be-handed-over terminal, an identifier of a target cell, and target frequency information.

In a possible implementation, the processor 1201 is further configured to: receive, through the communication interface 1202, a cell congestion status report sent by the first entity; and send a cell congestion relieve request to the first entity through the communication interface 1202, where the request includes a relieving policy, so that the first entity performs congestion relieving processing based on the relieving policy.

In a possible implementation, the cell congestion status report includes one or more of the following information: an identifier of a cell, a bearer type, an ARP, a congestion type, and a congestion level.

In a possible implementation, the processor 1201 is further configured to: receive, through the communication interface 1202, a cell status report sent by the first entity; and determine, based on the cell status report, whether to perform load balancing.

In a possible implementation, the cell status report includes one or more of the following information: an identifier of a cell, a quantity of terminals in the cell, a downlink capacity of the cell, uplink and downlink physical resource block usage of the cell, uplink and downlink physical resource block usage of a guaranteed bit rate of the cell, uplink and downlink physical resource block usage of a non-guaranteed bit rate of the cell, a hardware load level, and a transmission load level.

In a possible implementation, if the second entity determines to perform load balancing, the processor 1201 is further configured to: send a request of obtaining information about a neighboring cell to the first entity through the communication interface 1202; receive, through the communication interface 1202, the information about the neighboring cell that is sent by the first entity; and send a terminal release control message to the first entity through the communication interface 1202, so that the first entity performs reselection priority control based on the terminal release control message.

In a possible implementation, the information about the neighboring cell includes one or more of the following information: a serving cell identifier, an identifier of the neighboring cell, a quantity of terminals in the neighboring cell, uplink and downlink physical resource block usage of the neighboring cell, uplink and downlink physical resource block usage of a guaranteed bit rate of the neighboring cell, uplink and downlink physical resource block usage of a non-guaranteed bit rate of the neighboring cell, a hardware load level of the neighboring cell, and a transmission load level of the neighboring cell.

In a possible implementation, the terminal release control message includes one or more of the following information: an identifier of a cell, a quantity of to-be-released terminals, and a frequency on which camping is preferentially performed.

In a possible implementation, the processor 1201 is further configured to: after receiving, through the communication interface 1202, the information about the neighboring cell that is sent by the first entity, send a terminal selection policy control message to the first entity through the communication interface 1202, so that the first entity triggers, based on the terminal selection policy control message, the terminal to perform measurement, where the terminal selection policy control message includes one or more of the following information: an identifier of a cell, a quantity of connected-mode terminals to be triggered to perform measurement, and frequency information whose measurement is to be triggered; receive, through the communication interface 1202, a terminal selection result report sent by the first entity, where the terminal selection result report includes one or more of the following information: an identifier of a cell, a terminal list, and the measurement report of the terminal; determine a to-be-handed-over terminal based on the terminal selection result report; and send a handover control message to the first entity through the communication interface 1202, so that the first entity hands over the terminal based on the handover control message.

In a possible implementation, the handover control message includes one or more of the following information: a serving cell identifier, an identifier of the terminal, and a list of target neighboring cells.

Based on a same technical concept, an embodiment of this application further provides a communication system, including a CU-CP and at least one DU, where the CU-CP includes at least one first entity and a second entity.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more processes in the flowcharts and/or in one or more blocks in the block diagrams.

These computer program instructions may be alternatively stored in a computer-readable memory that can guide the computer or the another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of the claims of this application and their equivalent technologies.

The invention claimed is:

1. A communication method, comprising:
   sending, by a first entity, an access request of a terminal to a second entity;
   determining, by the second entity, whether there are enough resources that can be allocated to the terminal;
   in response to determining that there are not enough resources that can be currently allocated to the terminal, determining, by the second entity, a second terminal whose resource can be released;
   sending, by the second entity, a release request to the first entity, wherein the release request comprises an identifier of the second terminal and a serving cell identifier of the second terminal;
   determining, by the second entity based on the access request, whether to allow access of the terminal;
   sending, by the second entity, an access response to the first entity;
   in response to the access response indicating that access of the terminal is allowed, sending, by the first entity, a radio bearer (RB) setup request to the second entity;
   determining, by the second entity, whether to allow setup of an RB to the terminal;
   sending, by the second entity, an RB setup response to the first entity; and
   in response to the RB setup response indicating that setup of the RB to the terminal is allowed, triggering, by the first entity, setup of the RB to the terminal.

2. The communication method according to claim 1, wherein the access request further comprises one or more of the following information: a quantity of terminals that access a base station to which the first entity belongs, identifiers of one or more cells covered by the base station, or a quantity of terminals that access the one or more cells.

3. The communication method according to claim 1, wherein after the sending, by a first entity, an access request of a terminal to a second entity, the communication method further comprises:
   receiving, by the first entity, the release request sent by the second entity; and
   releasing, by the first entity, a resource of the second terminal based on the release request.

4. The communication method according to claim 1, wherein the access request comprises RB information that is obtained from a distributed unit (DU), and managed by the DU.

5. The communication method according to claim 4, wherein after the sending, by the first entity, an RB setup request to the second entity, the communication method further comprises:
   sending, by the second entity, an RB release request to the first entity, wherein the RB release request comprises one or more of the following information: an identifier of a to-be-released terminal, a serving cell identifier of the to-be-released terminal, or information about a to-be-released RB; and
   releasing, by the first entity, an RB of the to-be-released terminal based on the RB release request.

6. The communication method according to claim 1, further comprising:
   sending, by the second entity, a handover indication to the first entity, wherein the handover indication is used to request to hand over a terminal that accesses the second entity to a third entity corresponding to a neighboring centralized unit control plane (CU-CP); and
   handing over, by the first entity according to the handover indication, the terminal that accesses the second entity to the third entity.

7. The communication method according to claim 6, wherein before the sending, by the second entity, a handover indication to the first entity, the communication method further comprises:
   receiving, by the first entity, a measurement report sent by the terminal; and
   sending, by the first entity, the measurement report to the second entity.

8. The communication method according to claim 6, wherein the handover indication comprises one or more of the following information: an identifier of a to-be-handed-over terminal, an identifier of a target cell, or target frequency information.

9. The communication method according to claim 1, further comprising:
   sending, by the first entity, a cell congestion status report to the second entity;
   sending, by the second entity, a cell congestion relieve request to the first entity, wherein the request comprises a relieving policy; and
   performing, by the first entity, congestion relieving processing based on the relieving policy.

10. The communication method according to claim 9, wherein before the sending, by the first entity, a cell congestion status report to the second entity, the communication method further comprises:
    receiving, by the first entity, configuration update information sent by a distributed unit (DU); and
    determining, by the first entity based on the configuration update information, cell congestion managed by the first entity.

11. The communication method according to claim 9, wherein the cell congestion status report comprises one or more of the following information: an identifier of a cell, a bearer type, an allocation retention priority (ARP), a congestion type, or a congestion level.

12. The communication method according to claim 1, further comprising:
    sending, by the first entity, a cell status report to the second entity; and
    determining, by the second entity based on the cell status report, whether to perform load balancing.

13. The communication method according to claim 12, wherein the cell status report comprises one or more of the following information: an identifier of a cell, a quantity of terminals in the cell, a downlink capacity of the cell, uplink and downlink physical resource block usage of the cell, uplink and downlink physical resource block usage of a guaranteed bit rate of the cell, uplink and downlink physical resource block usage of a non-guaranteed bit rate of the cell, a hardware load level, or a transmission load level.

14. A communication apparatus, comprising at least one first entity and a second entity, wherein the first entity comprises at least one first processor and one or more first memories coupled to the at least one first processor, and the second entity comprises at least one second processor and one or more second memories coupled to the at least one second processor, and wherein:
    the one or more first memories store instructions for execution by the at least one first processor to: send an access request of a terminal to a second entity;
    the one or more second memories store instructions for execution by the at least one second processor to:
        determine whether there are enough resources that can be allocated to the terminal;
        in response to determining that there are not enough resources that can be currently allocated to the terminal, determine a second terminal whose resource can be released;
        send a release request to the first entity, wherein the release request comprises an identifier of the second terminal and a serving cell identifier of the second terminal;
        determine, based on the access request, whether to allow access of the terminal; and
        send an access response to the first entity;
    the one or more first memories store instructions for execution by the at least one first processor to: in response to the access response indicating that access of the terminal is allowed, send a radio bearer (RB) setup request to the second entity;
    the one or more second memories store instructions for execution by the at least one second processor to:
        determine whether to allow setup of an RB to the terminal; and
        send an RB setup response to the first entity; and
    the one or more first memories store instructions for execution by the at least one first processor to: in response to the RB setup response indicating that setup of the RB to the terminal is allowed, trigger setup of the RB to the terminal.

15. The communication apparatus according to claim 14, wherein the access request further comprises one or more of the following information: a quantity of terminals that access a base station to which the first entity belongs, identifiers of one or more cells covered by the base station, or a quantity of terminals that access the one or more cells.

16. The communication apparatus according to claim 14, wherein the one or more first memories store instructions for execution by the at least one first processor to:
    after sending the access request of the terminal to the second entity, receive the release request sent by the second entity; and
    release a resource of the second terminal based on the release request.

17. The communication apparatus according to claim 14, wherein the access request comprises RB information that is obtained from a distributed unit (DU), and managed by the DU.

18. The communication apparatus according to claim 17, wherein:
    the one or more second memories store instructions for execution by the at least one second processor to: after sending, by the first entity, the RB setup request to the second entity, sending an RB release request to the first entity, wherein the RB release request comprises one or more of the following information: an identifier of a to-be-released terminal, a serving cell identifier of the to-be-released terminal, and information about a to-be-released RB; and
    the one or more first memories store instructions for execution by the at least one first processor to: release an RB of the to-be-released terminal based on the RB release request.

19. The communication apparatus according to claim 14, wherein:
    the one or more second memories store instructions for execution by the at least one second processor to: send a handover indication to the first entity, wherein the handover indication is used to request to hand over a terminal that accesses the second entity to a third entity corresponding to a neighboring centralized unit control plane (CU-CP); and
    the one or more first memories store instructions for execution by the at least one first processor to: hand over according to the handover indication, the terminal that accesses the second entity to the third entity.

20. A non-transitory computer-readable storage medium, wherein the non-transitory computer-readable storage medium stores computer-executable instructions for execution by at least one processor to:
    send, by a first entity, an access request of a terminal to a second entity;
    determine, by the second entity, whether there are enough resources that can be allocated to the terminal;
    in response to determining that there are not enough resources that can be currently allocated to the terminal, determine, by the second entity, a second terminal whose resource can be released;
    send, by the second entity, a release request to the first entity, wherein the release request comprises an identifier of the second terminal and a serving cell identifier of the second terminal;
    determine, by the second entity based on the access request, whether to allow access of the terminal;
    send, by the second entity, an access response to the first entity;
    in response to the access response indicating that access of the terminal is allowed, send, by the first entity, a radio bearer (RB) setup request to the second entity;
    determine, by the second entity, whether to allow setup of an RB to the terminal;
    send, by the second entity, an RB setup response to the first entity; and
    in response to the RB setup response indicating that setup of the RB to the terminal is allowed, trigger, by the first entity, setup of the RB to the terminal.

* * * * *